United States Patent [19]
Ohshima

[11] Patent Number: 4,797,734
[45] Date of Patent: Jan. 10, 1989

[54] PICKUP APPARATUS
[75] Inventor: Shigeru Ohshima, Tokyo, Japan
[73] Assignee: Canon Kabushiki Kaisha, Tokyo, Japan
[21] Appl. No.: 41,664
[22] Filed: Apr. 21, 1987

Related U.S. Application Data
[63] Continuation of Ser. No. 692,629, Jan. 18, 1985, abandoned.

[30] Foreign Application Priority Data
Jan. 31, 1984 [JP] Japan ................................ 59-16366

[51] Int. Cl.⁴ ............................................. H04N 9/097
[52] U.S. Cl. ...................................... 358/55; 358/225
[58] Field of Search ........................... 358/55, 225, 228

[56] References Cited

U.S. PATENT DOCUMENTS

| | | | |
|---|---|---|---|
| 2,061,016 | 11/1936 | Walton | 358/55 |
| 2,065,887 | 12/1936 | Colgate | 358/55 |
| 2,416,918 | 3/1947 | Goldsmith | 358/55 |
| 2,757,232 | 7/1956 | Goodale | 358/55 |
| 3,594,497 | 7/1971 | Graser, Jr. | 358/55 |
| 3,715,486 | 2/1973 | Wright et al. | 358/55 |
| 3,761,612 | 9/1973 | Alpers | 358/225 |
| 3,787,610 | 1/1974 | Murphy et al. | 358/55 |
| 3,812,526 | 5/1974 | Tan | 358/42 |
| 4,233,634 | 11/1980 | Adams | 358/55 |
| 4,308,551 | 12/1981 | Ohnuma et al. | 358/55 |
| 4,473,843 | 9/1984 | Bishop et al. | 358/228 |
| 4,553,170 | 11/1985 | Aoki | 358/55 |
| 4,556,912 | 12/1985 | Yamanaka | 358/55 |
| 4,566,029 | 1/1986 | Johnson | 358/55 |

FOREIGN PATENT DOCUMENTS 52-89927   7/1977   Japan .
597613   4/1978   Sweden .
585690   2/1947   United Kingdom .

Primary Examiner—Michael A. Masinick
Attorney, Agent, or Firm—Fitzpatrick, Cella, Harper & Scinto

[57] ABSTRACT

A high-speed pickup apparatus in which a rotary shutter is disposed on the intermediate image plane between a photo-taking lens and a relay lens.

9 Claims, 2 Drawing Sheets

PICKUP APPARATUS

This application is a continuation of application Ser. No. 692,629 filed 1/18/85, now abandoned.

BACKGROUND OF THE INVENTION

1. Field of the Invention

This invention relates to a pickup apparatus of a structure in which momentary exposure is repeated intermittently, and is particularly suitable for a television camera which effects high-speed image pickup.

2. Description of the Prior Art

Means for photographing an object moving at a high speed and slowly reproducing it is generally known as high-speed photography. In a camera used for this, i.e., a so-called high-speed camera, the object moving at a high speed must be momentarily exposed and photographed with the movement thereof being stopped.

Therefore, a high-speed camera has a mechanism for rotating a rotary shutter having a light-transmitting portion and causing the light beam of a lens to be transmitted therethrough for a very short time.

In a high-speed camera of this type, there is known a method as shown in FIG. 1A of the accompanying drawings wherein a shutter 2 (FIG. 1B of the accompanying drawings) having a sector opening is rotated in front of a lens system 1, or a method as shown in FIG. 2 of the accompanying drawings wherein a rotary shutter 2 is placed immediately in front of a pickup tube 4.

In the first-named method, the spatial limitation for disposing the shutter is loose, but where the light beam entering the lens is thick, it is necessary to make the diameter of the rotary shutter great and particularly, where a zoom lens is used, the light becomes thick at the telephoto end to such a degree that the diameter thereof is substantially equal to the diameter of the lens and therefore, the diameter of the rotary shutter becomes very great, and this leads to the problems in the power of the power source and the operability.

In the second-named method, the imaging plane is relatively small and therefore, the diameter of the rotary shutter can be made small, but great re-formation of the camera containing the shutter therein becomes necessary. Particularly, in a color TV camera, there are three imaging planes for effecting three-color resolution and therefore, it is very difficult to place the shutter on the imaging plane.

SUMMARY OF THE INVENTION

It is an object of the present invention to prevent a housing for containing a shutter therein form becoming remarkably bulky and to enable intermission of the photo-taking light beam on or near the image plane.

DESCRIPTION OF THE PREFERRED EMBODIMENTS

Figure 1A:
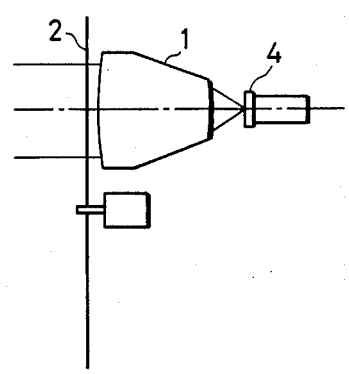
FIG. 1A is a cross-sectional view showing an example of the prior art.

Some embodiments of the present invention will hereinafter be described by reference to the drawings. In a first embodiment, an optical device is constituted by a first lens system 11 and a second lens system 16, and design is made such that the intermediate image 15 of an object to be photographed is formed by the first lens system and this intermediate image is further re-imaged on pickup elements 14, by the second lens system 16, and a rotary shutter 12 is disposed near the intermediate image.

Figure 1B:
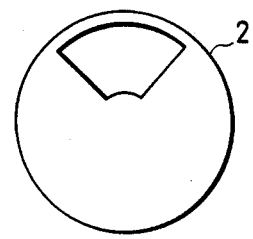
FIG. 1B is a plan view of a shutter.
Figure 2:
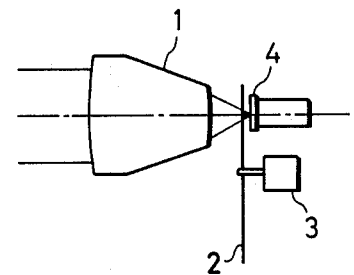
FIG. 2 is a cross-sectional view showing another example of the prior art.
Figure 3:
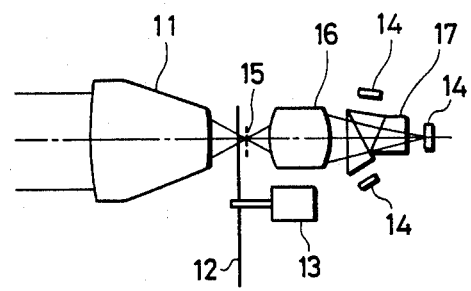
FIG. 3 is a cross-sectional view showing an embodiment of the present invention.

In FIG. 3, reference numeral 11 designates the first lens system which may be a zoom lens or a fixed focus lens. Reference numeral 15 denotes the intermediate image formed by the first lens system 11, reference numeral 14 designates the video pickup elements disposed correspondingly to respective color resolved lights, reference numeral 16 denotes the second lens system for re-imaging the intermediate image 15 on the pickup elements 14, and reference numeral 17 designates a three-color resolving prism. Reference numeral 12 denotes a rotary shutter like that shown in FIG. 1B, and reference numeral 13 designates a motor for intermittently driving the rotary shutter 12.

The light from an object (not shown) forms the intermediate image 15 by the first lens system 11. The rotary shutter 12 driven by the motor 13 is disposed near the intermediate image 15, and the light momentarily passes through the rotary shutter only when the opening portion thereof overlaps the intermediate image. The light passing through the rotary shutter is re-imaged on each pickup element 14 by the second lens system 16. In the embodiment of FIG. 3, there is shown a color TV lens having a color resolving prism 17. In such a case where a plurality of pickup surfaces are present, it is difficult to dispose the rotary shutter on the imaging plane, but according to the present invention, an effect equivalent thereto can be simply obtained.

Figure 4:
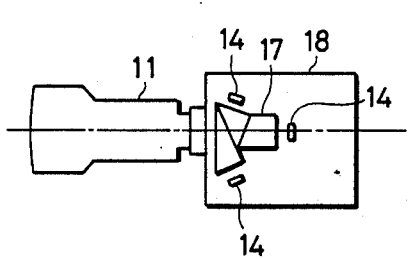
FIGS. 4 and 5 are cross-sectional views showing further embodiments of the present invention.
Figure 5:
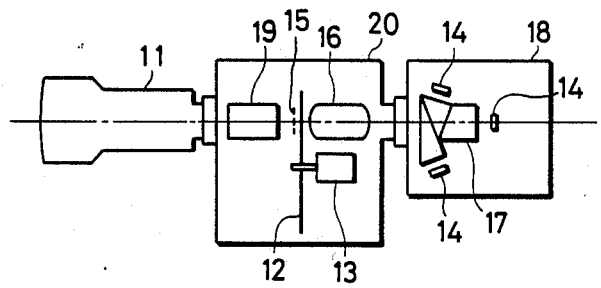

FIGS. 4 and 5 show embodiments for further making the best use of the feature of the present invention. A lens or glass block 19 for shortening the back focus, a rotary shutter 12 and a second lens system 16 are made into a unitary adapter 20 which is removably mountable with respect to a first lens system 11 and a camera body 18 through a mount.

With such a construction, in the case of normal photography in which momentary photographing is unnecessary, the first lens system 11 and the camera body 18 can be combined together to effect conventional photography, but where momentary photographing is to be effected, it can be easily effected by inserting the adapter 20 comprising a combination of the rotary shutter and the second lens system between the first lens system 11 and the camera body 18.

Further, this adapter system has a new advantage that existing various lens systems and cameras can be interchangeably used as the first lens system and the camera.

Instead of the light-intercepting plate provided with the opening, provision may be made of a mirror type shutter in which the portion corresponding to the opening in a mirror, and in that case, the optic axis will be bent. Further, instead of the rotary type shutter, use may be made of a shutter of the type in which a mask plate is parallel-moved.

According to the present invention, as described above, the shutter is disposed at the position of or near the intermediate image and this eliminates the necessity of re-forming the camera itself, and accordingly, the present invention is particularly effectively applicable to color TV cameras in which three-color resolution is effected.

Also, the fact that the shutter is disposed near the intermediate image leads to the effect that the diameter of the shutter can be made compact.

What I claim is:

1. An adapter to be attached between a first imaging system for forming an image of an object at a predetermined position and a camera body having video means for picking up the image of the object comprising:
   a second imaging system for re-imaging an image of the object formed at said predetermined position on said video means; and
   a shutter disposed at a position proximate to said predetermined position for repeatedly and periodically effecting intermittent exposures.

2. A pickup apparatus according to claim 1, wherein at least said shutter and said second imaging system are removably mountable with respect to the others.

3. A pickup apparatus according to claim 1, further comprising a color resolving optical system provided between said second imaging system and said pickup means.

4. A pickup apparatus according to claim 1, wherein said pickup means comprises a plurality of video pickup elements.

5. A pickup apparatus according to claim 1, wherein said shutter is a rotary shutter.

6. An adapter to be attached between a photographic lens and a camera body having a color separation system for color-separating an incident light and video devices for receiving a plurality of color components image comprising:
   a relay lens for re-imaging an intermediate image formed by said photographic lens on said video devices through said color separation optical system; and
   a shutter disposed at a position proximate to a point at which said intermediate image if formed by said photographic lens for effecting intermittent exposures.

7. A pickup apparatus according to claim 6, wherein said shutter is a rotary shutter.

8. An adapter to be attached between a photographic lens and camera body having a plurality of video devices and a color separation system for color-separating an incident light comprising:
   optical means for receiving a light beam emitted from said photographic lens and changing a back focus of a photographic lens, said optical means in turn emitting the light beam;
   image forming means for imaging the light beam emitted from said optical means on each of the video pickup devices through said color separation system; and
   a shutter disposed between said optical means and said image forming means for effecting intermittent exposures.

9. A pickup apparatus according to claim 8, wherein said shutter is a rotary shutter.

* * * * *

UNITED STATES PATENT AND TRADEMARK OFFICE
CERTIFICATE OF CORRECTION

PATENT NO. : 4,797,734
DATED : January 10, 1989
INVENTOR(S) : Ohshima

It is certified that error appears in the above-identified patent and that said Letters Patent is hereby corrected as shown below:

COLUMN 1

Line 54, change "form" to --from--.

COLUMN 4

Line 4, change "components" to --component--;
Line 5, change "image" to --images--; and
Line 11, change "if" to --is--.

Signed and Sealed this

Third Day of April, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,797,734
DATED : January 10, 1989
INVENTOR(S) : Shigeru Ohshima

It is certified that error appears in the above-identified patent and that said Letters Patent is hereby corrected as shown below:

COLUMN 3:

Line 20, change "A pickup apparatus" to --An adapter--.

Line 23, change "A pickup apparatus" to --An adapter--.

Line 27, change "A pickup apparatus" to --An adapter--.

Line 30, change "A pickup apparatus" to --An adapter--.

COLUMN 4:

Line 8, delete "optical".

Line 14, change "A pickup apparatus" to --An adapter--.

Line 22, change "a" to --the--.

Line 26, delete "pickup".

UNITED STATES PATENT AND TRADEMARK OFFICE
CERTIFICATE OF CORRECTION

PATENT NO. : 4,797,734

DATED : January 10, 1989

INVENTOR(S) : Shigeru Ohshima

It is certified that error appears in the above-identified patent and that said Letters Patent is hereby corrected as shown below:

Column 4, line 31, change "A pickup apparatus" to --An adapter--.

Signed and Sealed this

Thirty-first Day of July, 1990

*Attest:*

*Attesting Officer*

HARRY F. MANBECK, JR.

*Commissioner of Patents and Trademarks*